United States Patent [19]

Murayama et al.

[11] 3,975,357

[45] Aug. 17, 1976

[54] STABILIZED SYNTHETIC POLYMER COMPOSITIONS

[75] Inventors: Keisuke Murayama; Syoji Morimura; Takao Yoshioka, all of Tokyo, Japan

[73] Assignee: Sankyo Company Limited, Tokyo, Japan

[22] Filed: Apr. 5, 1974

[21] Appl. No.: 458,438

[30] Foreign Application Priority Data

Apr. 19, 1973 Switzerland........................ 5753/73
Jan. 26, 1974 Japan................................. 49-11128

[52] U.S. Cl.................... 260/45.8 N; 260/45.8 NZ
[51] Int. Cl.² ....................... C08K 5/15; C08K 5/34
[58] Field of Search .............................. 260/45.8 N

[56] References Cited
UNITED STATES PATENTS

| | | |
|---|---|---|
| 2,684,965 | 7/1954 | Weston et al. ................. 260/293.87 |
| 2,778,825 | 1/1957 | Melamed ........................... 260/244 |
| 3,126,393 | 3/1964 | Young ........................... 260/293.87 |
| 3,436,368 | 4/1969 | Murray .............................. 260/45.8 |
| 3,542,729 | 11/1970 | Murayama et al. ................. 260/45.8 |
| 3,759,926 | 9/1973 | Chalmers et al. ................. 260/293.9 |

FOREIGN PATENTS OR APPLICATIONS 4,631,733  9/1971  Japan

Primary Examiner—Lewis T. Jacobs
Assistant Examiner—R. A. White
Attorney, Agent, or Firm—Toren, McGeady and Stanger

[57] ABSTRACT

A synthetic polymer composition stabilized against photo- and thermal-deterioration thereof wherein there is incorporated, in a sufficient amount to prevent such deterioration, 1-substituted piperidine derivatives.

8 Claims, No Drawings

STABILIZED SYNTHETIC POLYMER COMPOSITIONS

This invention relates to a synthetic polymer composition stabilized against photo- and thermal deterioration thereof which comprises a 1-substituted piperidine derivative.

Certain compounds of the general formula

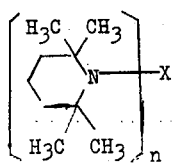

wherein $n$ represents 1 or 2, and when $n = 1$, X represents a lower alkyl, allyl, propargyl, benzyl, ethoxycarbonylmethyl, 2-hydroxyethyl, 2-hydroxypropyl, 2-hydroxy-2-phenethyl, 2-acyloxyethyl, 2-acyloxy-2-phenethyl, acetyl or methoxycarbonyl and when $n = 2$, X represents hexamethylene group; are disclosed concerning their utilities mainly as pharmaceuticals in, for example, J. Pharmacol. 13 501–20 (1958), J. Med. Chem. 6 381–4 (1963), J. Org. Chem. 27 1695–1703 (1962), C. A. 62 9098h, Beilstein 20 129, British Pat. Nos. 834,290 and 1,143,371. While, their activities to give stability for polymeric materials have not been known yet. As a stabilizer, there is disclosed in Japanese Patent Publication No. 46-31733 a compound of the above formula wherein X is a hydrogen atom, i.e., 2,2,6,6-tetramethylpiperidine gives light-stabilizing activity for polyolefins.

Now, the inventors have found that piperidine derivatives having a substituent at 1-position give unexpectedly high degree of stabilities for polymeric materials, especially against their photo- and thermal-degradations. Moreover, the piperidine derivatives have superior characteristics required for a stabilizer in the art.

Accordingly, this invention is to provide a synthetic polymer composition stabilized against light and heat by having incorporated therein at least one of the 1-substituted piperidine derivatives having the following formula (I) in a sufficient amount to prevent such deterioration.

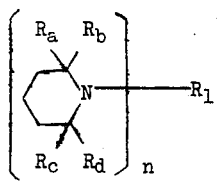

In the above formula, $n$ represents 1 or 2.
$R_1$ represents when $n = 1$,
  oxyl radical, hydroxy group, an alkyl group, a substituted alkyl group, an alkenyl group, an alkynyl group, an aralkyl group, a substituted aralkyl group or an acyl group,
when $n = 2$,
  an alkylene group (the alkylene chain may optionally be interrupted by an oxygen atom), 2-butenylene group, a group of the formula —CH$_2$CO.O—R$_7$—O—COCH$_2$— wherein R$_7$ represents an alkylene group or xylylene group, or a group of the formula —CH$_2$.CH$_2$—O.CO$-$(R$_8$)$_m$—CO.O—CH$_2$.CH$_2$— wherein $m$ represents 0 or 1, R$_8$ represents an alkylene group (the alkylene chain may optionally be interrupted by a sulfur atom), an alkenylene group, phenylene group or 1,4-cyclohexylene group.

$R_a$ and $R_b$ represent methyl group or $R_a$ and $R_b$ together with carbon atom to which they are attached, form cyclohexyl group.

$R_c$ represents methyl group.

$R_d$ represents an alkyl group having 1 to 5 carbon atoms.

$R_c$ and $R_d$, together with carbon atom to which they are attached, may form cyclopentyl group, cyclohexyl group, a group of the formula

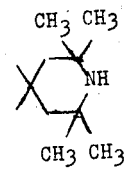

or a group of the formula

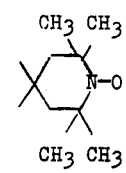

The following groups ($I_a$) and ($I_b$) are subgroups of compounds of the formula (I).

The group ($I_a$) has the following formula.

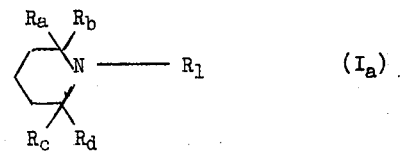

In the above formula ($I_a$), $R_a$, $R_b$, $R_c$ and $R_d$ have the same meanings as defined above. $R_1$ represents oxyl radical, hydroxy group, an alkyl group, a substituted alkyl group, an alkenyl group, an alkynyl group, an aralkyl group a substituted aralkyl group or an acyl group.

In the above formula ($I_a$), examples of $R_1$ are an alkyl group such as methyl, ethyl, propyl, butyl, pentyl or hexyl; a substituted alkyl group, for example, a halogenoalkyl such as 2-chloroethyl, 2-bromoethyl or 2-chloropropyl, an epoxyalkyl such as 2,3-epoxypropyl, a hydroxyalkyl such as 2-hydroxyethyl, 2-hydroxypropyl or 3-hydroxypropyl, an alkoxycarbonylalkyl such as hexyloxycarbonylmethyl, an alkoxyalkyl such as 2-methoxyethyl, 2-ethoxyethyl, 2-propoxyethyl or 3-methoxypropyl, an acyloxyalkyl such as 2-acetoxyethyl, 2-acetoxypropyl or 2-stearoyloxyethyl; an alkenyl group such as allyl or methallyl; an alkynyl group such as propargyl; an aralkyl group such as benzyl or α-methylbenzyl; a substituted aralkyl group, for example, hydroxyaralkyl such as 2-hydroxy-2-phenethyl; an acyl group, for example, an aliphatic acyl group such as formyl or acetyl.

In the above formula ($I_a$) preferable groups of $R_1$ are oxyl radical, an alkyl group having 1 to 8 carbon atoms, a halogenoalkyl group having 1 to 5 carbon atoms, a cyanoalkyl group having 1 to 5 carbon atoms, an epoxyalkyl group having 3 or 4 carbon atoms, a hydroxyalkyl group having 2 to 5 carbon atoms, an acyloxyalkyl group having 4 to 20 carbon atoms, an aminoalkyl group having 2 to 4 carbon atoms, an alkoxycarbonylalkyl group having 3 to 21 carbon atoms, an alkoxyalkyl group having 3 to 20 carbon atoms, an alkenyl group having 3 to 6 carbon atoms, an alkynyl group having 3 to 6 carbon atoms, an aralkyl group having 7 to 20 carbon atoms, a hydroxyaralkyl group having 8 to 12 carbon atoms or an acyl group having 2 to 18 carbon atoms.

Preferable $R_a$ and $R_b$ are methyl group.

Preferable $R_c$ and $R_d$ are methyl group or $R_c$ and $R_d$, together with carbon atom to which they are attached form cyclohexyl group or a group of the formula

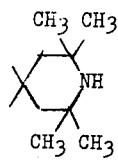

Particularly preferable $R_c$ and $R_d$ are methyl group.

The alternative group ($I_b$) has the following formula.

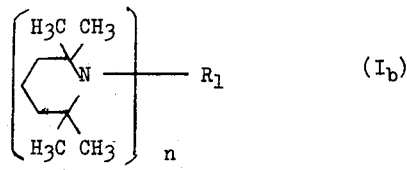

In the above formula ($I_b$), $n$ represents 1 or 2, $R_1$ represents when $n = 1$,
an alkyl group having 1 to 18 carbon atoms;
an alkenyl group having 3 to 10 carbon atoms;
an alkynyl group having 3 or 4 carbon atoms;
a benzyl group optionally substituted with 1 to 3 substituents,
which may be the same or different, selected from chlorine, an alkyl having 1 to 4 carbon atoms, an alkoxy having 1 to 8 carbon atoms and hydroxy in its phenyl moiety; phenethyl group; 2,3-epoxypropyl group; or a group of the formula

(wherein $R_2$ represents an alkyl group having 1 to 18 carbon atoms, an alkenyl group having 3 to 6 carbon atoms, phenyl group, benzyl group, cyclohexyl group or 2,3-epoxypropyl group); or a group of the formula

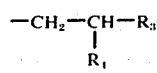

(wherein $R_3$ represents hydrogen atom, methyl group or phenyl group; $R_4$ represents hydroxy group or a group of the formula $-O.COR_5$; $R_5$ represents an alkyl group having 1 to 17 carbon atoms, an alkenyl group having 2 to 4 carbon atoms, a phenyl group optionally substituted with 1 to 3 substituents, which may be the same or different, selected from chlorine, an alkyl having 1 to 4 carbon atoms, an alkoxy having 1 to 8 carbon atoms and hydroxy, benzyl group, 3,5-di-tertiary butyl-4-hydroxyphenethyl group, styryl group or cyclohexyl group); or a group of the formula

(wherein $R_6$ represents hydrogen atom, methyl group, an alkenyl group having 2 or 3 carbon atoms, an alkoxy group having 1 to 8 carbon atoms, benzyloxy group or phenoxy group);
and when $n = 2$,
$R_1$ represents an alkylene group having 1 to 6 carbon atoms (the alkylene chain may optionally be interrupted by an oxygen atom); 2-butenylene group; or a group of the formula

(wherein $R_7$ represents an alkylene group having 2 to 6 carbon atoms or xylylene group);
or a group of the formula

(wherein $m$ represents 0 or 1; $R_8$ represents an alkylene group having 1 to 10 carbon atoms (the alkylene chain may optionally be interrupted by a sulfur atom), an alkenylene group having 2 to 4 carbon atoms, phenylene group or 1,4-cyclohexylene group).

In the above formula ($I_b$),
when $n = 1$,
examples of the alkyl group of $R_1$ are methyl, ethyl, propyl, butyl, isobutyl, isopentyl, hexyl, octyl, dodecyl and octadecyl. Examples of the alkenyl group of $R_1$ are allyl, crotyl, 2-hexenyl and 2-decenyl. Examples of the alkynyl group of $R_1$ are propargyl and 2-butynyl. Examples of the substituted or unsubstituted benzyl group of $R_1$ are benzyl, o-, m- or p-chloro, p-methyl, p-ethyl, p-isopropyl, p-methoxy, p-butoxy, p-octoxy or 3,5-di-tertiary butyl-4-hydroxybenzyl.

Examples of the alkyl group of $R_2$ are methyl, ethyl, butyl isopentyl, octyl, dodecyl and octadecyl.

Examples of the alkenyl group of $R_2$ are allyl, crotyl and 2-hexenyl.

Examples of the alkyl group of $R_5$ are methyl ethyl, propyl, isopropyl, heptyl, 1-ethylpentyl, undecyl, pentadecyl and heptadecyl.

Examples of the alkenyl group of $R_5$ are vinyl, 1-propenyl, isopropenyl and 2-methyl-1-propenyl.

Examples of the substituted or unsubstituted phenyl group of $R_5$ are phenyl, m- or p-chloro, 2,4-dichloro, o- or p-methyl, p-isopropyl, p-tertiary butyl, p-ethoxy, p-butoxy, p-octoxy, 3,4,5-trimethoxy, o-hydroxy or 3,5-di-tertiary butyl-4-hydroxyphenyl.

Examples of the alkenyl group of $R_6$ are vinyl and 1-propenyl.

Examples of the alkoxy group of $R_6$ are methoxy, ethoxy, isobutoxy and octoxy.

when $n = 2$,

Examples of the alkylene group of $R_1$ are methylene, ethylene, tetramethylene and hexamethylene.

An example of the alkylene group of which chain is interrupted by an oxygen atom is oxydiethyl.

Examples of the alkylene group of $R_7$ are ethylene, tetramethylene and hexamethylene.

Examples of the xylylene group of $R_7$ are m- or p-xylylene.

Examples of the alkylene group of $R_8$ are methylene, ethylene, tetramethylene, octamethylene and decamethylene.

An example of the alkylene group of which chain is interrupted by a sulfur atom is thiodiethyl.

Examples of the alkylene group of $R_8$ are vinylene, 2-propene-1,2-ylene, and 2-butenylene.

Examples of the phenylene group of $R_8$ are m- or p-phenylene.

In the above formula ($I_b$), preferable groups of $R_1$ are, when $n = 1$, alkyl group having 4 to 12 carbon atoms, particularly, butyl, octyl and dodecyl; allyl group; and benzyl group optionally substituted with an alkyl having 1 to 4 carbon atoms, methoxy or 3,5-di-tertiary butyl-4-hydroxy in the phenyl moiety and among these substituted or unsubstituted benzyl group, particularly preferable is benzyl.

The group of the formula —$CH_2CO.OR_2$ is a preferable example of $R_1$. Particularly preferabe $R_2$ are an alkyl group having 1 to 18 carbon atoms and allyl group.

The group of the formula

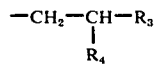

is a preferabe example of $R_1$ and the preferable combinations of $R_3$ and $R_4$ are, $R_3$ is hydrogen atom, methyl group and phenyl group, particularly hydrogen atom, and $R_4$ is particularly preferably, either hydroxy group or the group of the formula —$O.COR_5$ wherein $R_5$ represents an alkyl group having 1 to 17 carbon atoms; alkenyl group having 2 or 3 carbon atoms; and phenyl group optionally substituted with an alkyl having 1 to 4 carbon atoms, alkoxy having 1 to 8 carbon atoms or hydroxy, particularly unsubstituted phenyl.

Further, 3,5-di-tertiary butyl-4-hydroxyphenethyl group is a preferable example of $R_5$.

When $n = 2$, preferable $R_1$ are, alkylene group having 2 to 6 carbon atoms, particularly ethylene and hexamethylene.

The group of the formula —$CH_2.CO.O$—$R_7$—$O.CO.CH_2$— is a preferable example of $R_1$. Preferable example of $R_7$ is alkylene group having 2 to 6 carbon atoms, particularly ethylene and hexamethylene.

The group of the formula —$CH_2.CH_2.O.CO$—$R_8$—$CO.O.CH_2.CH_2$— is a preferable example of $R_1$. Preferable example of $R_8$ is alkylene group having 1 to 8 carbon atoms, particularly methylene, ethylene, tetramethylene and octamethylene. m- or p-phenylene group are also preferable examples of $R_8$.

Typical compounds of the above general formula (I) are as follows:

1. 1,2,2,6,6-Pentamethylpiperidine
2. 1-Butyl-2,2,6,6tetramethylpiperidine
3. 1-Octyl-2,2,6,6-tetramethypiperidine
4. 1-Dodecyl-2,2,6,6-tetramethylpiperidine
5. 1-Octadecyl-2,2,6,6-tetramethypiperidine
6. 1-Allyl-2,2,6,6-tetramethylpiperidine
7. 1-Crotyl-2,2,6,6-tetramethylpiperidine
8. 1-Propargyl-2,2,6,6-tetramethylpiperidine
9. 1-Benzyl-2,2,6,6-tetramethylpiperidine
10. 1-Phenethyl-2,2,6,6-tetramethylpiperidine
11. 1-(o-Chlorobenzyl)-2,2,6,6-tetramethylpiperidine
12. 1-(m-Chlorobenzyl)-2,2,6,6-tetramethylpiperidine
13. 1-(p-Chlorobenzyl)-2,2,6,6-tetramethylpiperidine
14. 1-(p-Methylbenzyl)-2,2,6,6-tetramethylpiperidine
15. 1-(3,5-di-tertiary Butyl-4-hydroxybenzyl)-2,2,6,6-tetramethylpiperidine
16. 1-(p-Methoxybenzyl)-2,2,6,6-tetramethylpiperidine
17. 1-(2,3-Epoxypropyl)-2,2,6,6-tetramethylpiperidine
18. 1-Methoxycarbonylmethyl-2,2,6,6-tetramethylpiperidine
19. 1-Ethoxycarbonylmethyl-2,2,6,6-tetramethylpiperidine
20. 1-Butoxycarbonylmethyl-2,2,6,6-tetramethylpiperidine
21. 1-Octoxycarbonylmethyl-2,2,6,6-tetramethylpiperidine
22. 1-Dodecyloxycarbonylmethyl-2,2,6,6-tetramethylpiperidine
23. 1-Octadecyloxycarbonylmethyl-2,2,6,6-tetramethylpiperidine
24. 1-Allyloxycarbonylmethyl-2,2,6,6-tetramethylpiperidine
25. 1-Benzyloxycarbonylmethyl-2,2,6,6-tetramethylpiperidine
26. 1-Cyclohexyloxycarbonylmethyl-2,2,6,6-tetramethylpiperidine
27. 1-(2-Hydroxyethyl)-2,2,6,6-tetramethylpiperidine
28. 1-(2-Hydroxypropyl)-2,2,6,6-tetramethylpiperidine
29. 1-(2-Hydroxy-2-phenylethyl)-2,2,6,6-tetramethylpiperidine
30. 1-(2-Acetoxyethyl)-2,2,6,6-tetramethylpiperidine
31. 1-(2-Acetoxypropyl)-2,2,6,6-tetramethylpiperidine
32. 1-(2-Acetoxy-2-phenylethyl)-2,2,6,6-tetramethylpiperidine
33. 1-(2-Propionyloxy-2-phenylethyl)-2,2,6,6-tetramethylpiperidine
34. 1-(2-Butyryloxypropyl)-2,2,6,6-tetramethylpiperidine
35. 1-(2-Lauroyloxyethyl)-2,2,6,6-tetramethylpiperidine
36. 1-(2-Lauroyloxypropyl)-2,2,6,6-tetramethylpiperidine
37. 1-(2-Lauroyloxy-2-phenylethyl)-2,2,6,6-tetramethylpiperidine
38. 1-(2-Stearoyloxyethyl)-2,2,6,6-tetramethylpiperidine
39. 1-(2-Stearoyloxy-2-phenylethyl)-2,2,6,6-tetramethylpiperidine
40. 1-(2-Acryloyloxyethyl)-2,2,6,6-tetramethylpiperidine 41. 1-(2-Crotonoyloxyethyl)-2,2,6,6-tetramethylpiperidine
42. 1-(2-Crotonoyloxypropyl)-2,2,6,6-tetramethylpiperidine
43. 1-(1-(2-Methacryloyloxyethyl)-2,2,6,6-tetramethylpiperidine
44. 1-(2-Benzoyloxyethyl)-2,2,6,6-tetramethylpiperidine
45. 1-(2-Benzoyloxypropyl)-2,2,6,6-tetramethylpiperidine
46. 1-(2-Benzoyloxy-2-phenylethyl)-2,2,6,6-tetramethylpiperidine
47. 1-[2-(m-Chlorobenzoyloxy)ethyl]-2,2,6,6-tetramethylpiperidine
48. 1-[2-(p-Chlorobenzoyloxy)-2-phenylethyl]-2,2,6,6-tetramethylpiperidine
49. 1-[2-(p-Toluoyloxy)propyl]-2,2,6,6-tetramethylpiperidine
50. 1-[2-(p-tertiary Butylbenzoyloxy)ethyl]-2,2,6,6-tetramethylpiperidine
51. 1-[2-(3,5-di-tertiary Butyl-4-hydroxybenzoyloxy)propyl]-2,2,6,6-tetramethylpiperidine
52. 1-[2-(p-Methoxybenzoyloxy)-2-phenylethyl]-2,2,6,6-tetramethylpiperidine
53. 1-[2-(3,4,5-Trimethoxybenzoyloxy)ethyl]-2,2,6,6-tetramethylpiperidine
54. 1-[2-(p-Butoxybenzoyloxy)ethyl]-2,2,6,6-tetramethylpiperidine
55. 1-[2-(p-Octoxybenzoyloxy)propyl]-2,2,6,6-tetramethylpiperidine
56. 1-(2-Salicyloyloxyethyl)-2,2,6,6-tetramethylpiperidine
57. 1-(2-Phenylacetoxyethyl)-2,2,6,6-tetramethylpiperidine
58. 1-{2-[3-(3,5-di-tertiary Butyl-4-hydroxyphenyl)propionyloxy]ethyl}-2,2,6,6-tetramethylpiperidine
59. 1-(2-Cinnamoyloxy-2-phenylethyl)-2,2,6,6-tetramethylpiperidine
60. 1-(2-Cyclohexanecarbonyloxypropyl)-2,2,6,6-tetramethylpiperidine
61. 1-Formyl-2,2,6,6-tetramethylpiperidine
62. 1-Acetyl-2,2,6,6-tetramethylpiperidine
63. 1-Acryloyl-2,2,6,6-tetramethylpiperidine
64. 1-Crotonoyl-2,2,6,6-tetramethylpiperidine
65. 1-Methoxycarbonyl-2,2,6,6-tetramethylpiperidine
66. 1-Octoxycarbonyl-2,2,6,6-tetramethylpiperidine
67. 1-Benzyloxycarbonyl-2,2,6,6-tetramethylpiperidine
68. 1,2-Bis (2,2,6,6-tetramethylpiperidino) ethane
69. 1,4-Bis (2,2,6,6-tetramethylpiperidino) butane
70. 1,6-Bis (2,2,6,6-tetramethylpiperidino) hexane
71. 2,2'-Bis (2,2,6,6-tetramethylpiperidino) ethyl ether
72. 1,4-Bis (2,2,6,6-tetramethylpiperidino)-trans-2-butene
73. 1,2-Bis (2,2,6,6-tetramethylpiperidino-acetoxy) ethane
74. 1,6-Bis (2,2,6,6-tetramethylpiperidino-acetoxy) hexane
75. 1,4-Bis (2,2,6,6-tetramethylpiperidino-acetoxy) benzene
76. Bis [2-(2,2,6,6-tetramethylpiperidino) ethyl] oxalate
77. Bis [2-(2,2,6,6-tetramethylpiperidino) ethyl] malonate
78. Bis [2-(2,2,6,6-tetramethylpiperidino) ethyl] succinate
79. Bis [2-(2,2,6,6-tetramethylpiperidino) ethyl] adipate
80. Bis [2-(2,2,6,6-tetramethylpiperidino) ethyl] sebacate
81. Bis [2-(2,2,6,6-tetramethylpiperidino) ethyl]-1,10-decane dicarboxylate
82. Bis [2-(2,2,6,6-tetramethylpiperidino) ethyl] thiodipropionate
83. Bis [2-(2,2,6,6-tetramethylpiperidino) ethyl] maleate
84. Bis [2-(2,2,6,6-tetramethylpiperidino) ethyl] terephthalate
85. Bis [2-(2,2,6,6-tetramethylpiperidino) ethyl] isophthalate
86. Bis [2-(2,2,6,6-tetramethylpiperidino) ethyl] 1,4-cyclohexane dicarboxylate The compounds of the above formula (I) are prepared according to the following methods (A) - (F).

A. Compounds of the formula (II) are prepared by a reaction of piperidines (III) with corresponding halides (IV), according to the method described in British Patent No. 834,290 where piperidine (III) is reacted with allyl bromide.

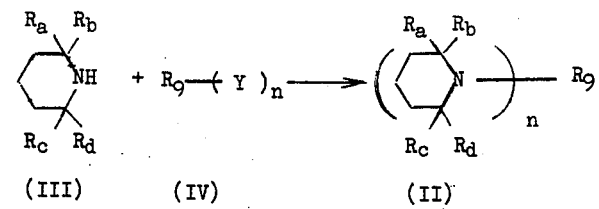

(In the above formulae, $R_a$, $R_b$, $R_c$ and $R_d$ have the same meanings as defined above.) $n$ represents 1 or 2.
$R_9$ represents, when $n = 1$, an alkyl group, an alkenyl group, an alkynyl group, a substituted or unsubstituted benzyl group, phenethyl group, 2,3-epoxypropyl group a cyanoalkyl group, an aminoalkyl group, an alkoxyalkyl group or a group of the formula —$CH_2CO.OR_2$ ($R_2$ has the same meaning as defined above), and when $n = 2$, $R_9$ represents an alkylene group (including those which are interrupted by an oxygen atom) or 2-butenylene group. Y represents a halogen atom.)

B. Compounds of the formulae (V) and (V') are also prepared by transesterification reaction of compounds of the formula (VI) with corresponding alcohols (VII) or (VII').

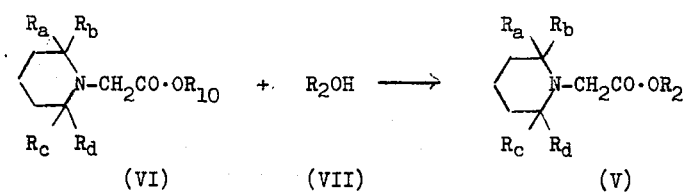

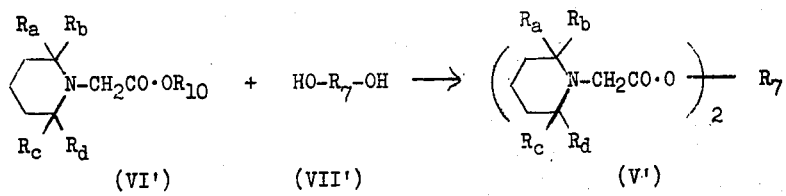

(In the above formulae, $R_{10}$ represents an lower alkyl group. $R_a$, $R_b$, $R_c$, $R_d$, $R_2$ and $R_7$ have the same meanings as defined above.)

C. Compounds of the formula (VIII) are prepared by a reaction of piperidines (III) with corresponding oxido compounds (IX), according to the method described in British Pat. No. 1,143,371.

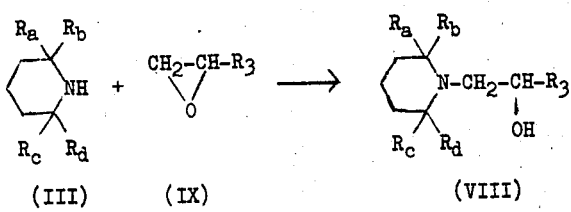

(In the above formulae, $R_a$, $R_b$, $R_c$, $R_d$ and $R_3$ have the same meanings as defined above.)

D. Compounds of the formulae (X) and (X′) are prepared by a reaction of compounds of the formulae (VIII) or (VIII′) with corresponding reactive derivatives of acid, e.g., acid halides (XI) or (XI′), according to the method described in British Pat. No. 1,143,371.

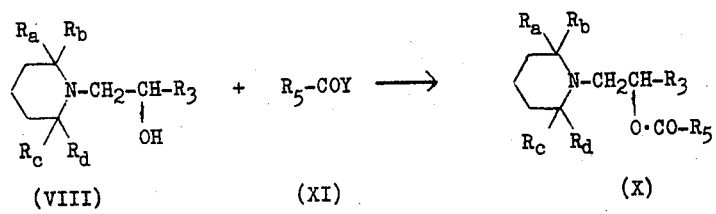

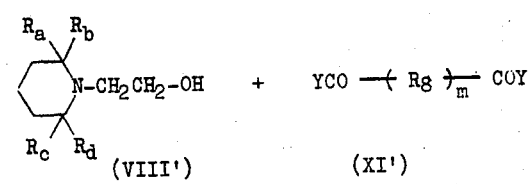

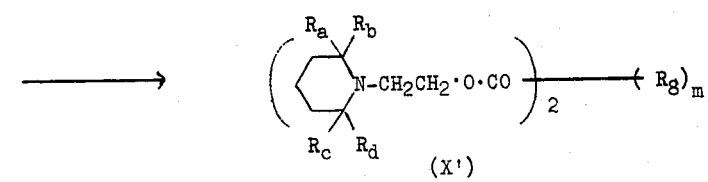

(In the above formulae, $R_a$, $R_b$, $R_c$, $R_d$, $R_3$, $R_5$, $R_8$, Y and $m$ have the same meanings as defined above.)

E. Compounds of the formula (XI) are prepared by a reaction of piperidines (III) with corresponding reactive derivatives of acid e.g., acid halide (XII), according to the method described in J. Med. Chem. 6, 381–4 (1963).

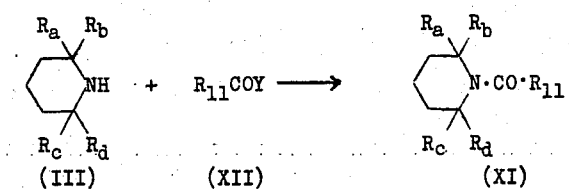

(In the above formulae, $R_a$, $R_b$, $R_c$ and $R_d$ have the same meanings as defined above, $R_{11}$ represents methyl group or an alkenyl group. Y represents a halogen atom.)

Compounds of the formula (XIII) are prepared by a similar method except that chlorocarbonate (XIV) is used in place of the above acid halide.

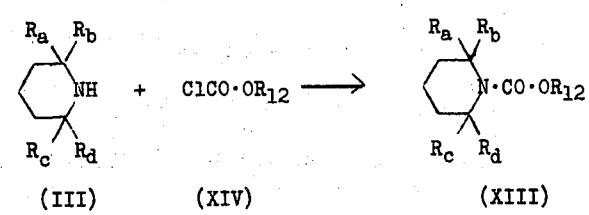

(In the above formulae, $R_a$, $R_b$, $R_c$ and $R_d$ have the same meanings as defined above, $R_{12}$ represents an alkyl group, benzyl group or phenyl group.)

F. Compounds of the formula (XV) are prepared by a reaction of piperidines (III) with ethyl orthoformate in the presence of an acid catalyst.

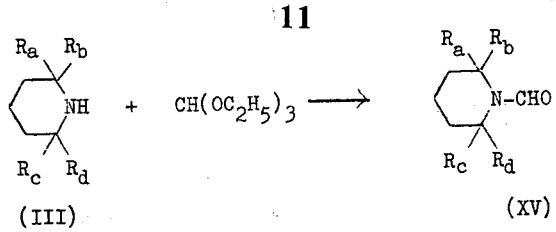

(In the above formulae, $R_a$, $R_b$, $R_c$ and $R_d$ have the same meanings as defined above.)

The above reactions (A), (D) and (E) at which hydrogen halide is removed in the reaction system are carried out, if necessary, in the presence of acid binding agents. Such acid binding agents may be inorganic or organic bases; alternatively, excess amount of amines used as raw materials can serve as the acid binding agents.

The reaction is conveniently carried out by heating the reactants in the presence or absence of an inert solvent.

The above transesterification reaction B) is carried out in the presence of a catalyst such as alkoxide, amide or hydroxide of alkali metals under heating; the alcohols formed in situ are preferably removed from the reaction system.

Compounds of the above general formula (I) impart to synthetic polymeric materials an exceptionally high degree of stability towards deterioration induced by heat and light.

Moreover, this improved stability is achieved without affecting the color properties of the synthetic polymeric materials and without influenced by other light protecting agents, stabilizers, plasticizers, pigments particularly organic pigments and so on which are added, if necessary.

The stabilizers of this invention provide effective light and/or heat stabilization for synthetic polymeric materials exemplified hereinbelow.

Polyolefins especially low and high-density polyethylene, polypropylene, polystyrene, polybutadiene, polyisoprene, other olefin homopolymer, ethylene-propylene copolymer, ethylene-butene copolymer, ethylene-vinyl acetate copolymer, styrene-butadiene copolymer, acrylonitrile-styrene-butadiene copolymer, and other copolymers of other ethylene-forming unsaturated monomer with olefin;
polyvinyl chlorides and polyvinylidene chlorides, especially homopolymer of vinyl chloride, homopolymer of vinylidene chloride, copolymer of vinyl chloride with vinylidene chloride, copolymer of each of vinylchloride and vinylidene chloride with vinyl acetate or other ethylene-forming unsaturated monomer;
polyacetals, especially polyoxymethylene and polyoxyethylene;
polyesters, especially polyethylene terephthalate;
polyamides, e.g., polyamides having amide groups in the repetition unit of the main chain as necessary part, especially 6-nylon,6,6-nylon and 6,10-nylon;
polyurethanes, especially polyether polyurethane and polyester polyurethane; and,
epoxyresins, especially reaction products of epichlorohydrin with polyphenols.

The stabilizers of this invention provide excellent stability for fibres, films, sheets, other molding products, latex, foams and paints comprising the abovementioned polymeric materials.

The amount of the compound of the formula (I) which may be added to a polymeric material in order to give protection in the maximum effect against deteriorations induced by light and heat is varied upon properties of the substance to be treated, intensity of light irradiation and length of exposure time. However, in general, the compound of the formula (I) is employed in a proportion within the range of 0.01 – 5% by weight, advantageously 0.1 – 2% by weight based on the weight of untreated polymeric material.

The compounds of formula (I) may be incorporated into a polymeric material by any of the known techniques for compounding additives with a polymer. For example, the above compound and the polymer may be compounded in an internal mixer. Alternatively, the above compound may be added as a solution or slurry in a suitable solvent or dispersant, for instance, an inert organic solvent such as methanol, ethanol or acetone to powdered polymer and the whole mixed intimately in a mixer. As a further alternative the above compound may be added to the polymer during the preparation of the latter, for instance, at the latex stage of polymer production, to provide pre-stabilized polymer material.

Optionally, the composition of this invention may contain one or more other additives, especially those used in polymeric material formulations, such as antioxidants of phenol or amine type and light protection agents, phosphite stabilizers, peroxide decomposers, polyamide stabilizers, basic co-stabilizers, polyvinyl chloride stabilizers, nucleating agents, plasticizers, lubricants, emulsifiers, anti-static agents, flame-protectants, pigments, carbon black, asbestos, glass fibres, kaolin and talc.

The present invention, therefore, includes binary, tertiary and multi-component compositions containing the stabilizers of formula (I) together with one or more functional additives for polymers.

Suitable examples of the abovementioned additives are selected from the following groups.

Especially, binary combination of the compounds of formula (I) with antioxidants exemplified hereinbelow impart to polyolefins an exceptionally effective stability.

Antioxidants

Simple 2,6-dialkylphenols, such as, for example, 2,6-di-tert.-butyl-4-methylphenol, 2-tert.-butyl-4,6-dimethylphenol, 2,6-di-tert.butyl-4-methoxymethylphenol and 2,6-dioctadecyl-4-methylphenol.

Derivatives of alkylated hydroquinones, such as, for example, 2,5-di-tert.-butyl-hydroquinone, 2,5-di-tert.-amyl-hydroquinone, 2,6-di-tert.-butyl-hydroquinone, 2,5-di-tert.-butyl-4-hydroxy-anisole, 3,5-di-tert.-butyl-4-hydroxy-anisole and tris(3,5-di-tert.-butyl-4-hydroxyphenyl)phosphite, 3,5-di-tert.-butyl-4-hydroxyphenyl-stearate, di-(3,5-di-tert.-butyl-4-hydroxyphenyl)-adipate.

Hydroxylated thiodiphenyl ethers, such as, for example, 2,2'-thiobis(6-tert.-butyl-4-methylphenol), 2,2'-thiobis-(4-octylphenol), 4,4'-thiobis-(6-tert.-butyl-3-methylphenol), 4,4'-thiobis-(3,6-di-sec.-amylphenol) and 4,4'-thiobis-(6-tert.-butyl-2-methylphenol), 4,4'-Bis-(2,6-dimethyl-4-hydroxyphenyl)-disulfide.

Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di-(3- tert.-butyl-5-methyl-2-hydroxybenzyl)-4-methyl-phenol, 2,2'-methylene-bis-[4-methyl-6-(α-methylcyclohexyl)-phenol], 1,1-bis-(3,5-dimethyl-2-hydroxyphenyl)-butane, 1,1-bis-(5-tert.-butyl-4-hydroxy-2-methylphenyl)butane, 2,2-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra(5-tert.-butyl-4-hydroxy-2-methylphenyl)-pentane and ethylene glycol-bis-[3,3-bis-(3'-tert.-butyl-4'-hydroxyphenyl)-butyrate].

O-, N- and S-benzyl compounds, such as, for example, 3,5,3',5'-tetra-tert.-butyl-4,4'-dihydroxydibenzyl-ether, 4-hydroxy-3,5-dimethylbenzylmercaptoacetic acid octadecyl ester, tri-(3,5-di-tert.-butyl-4-hydroxybenzyl)-amine, and bis-(4-tert.-butyl-3-hydroxy-2,6-dimethylbenzyl)-dithiolterephthalate.

Hydroxybenzylated malonic esters, such as, for example, 2,2-bis-(3,5-di-tert.-butyl-2-hydroxybenzyl)-malonic acid dioctadecyl ester, 2-(3-tert.-butyl-4-hydroxy-5-methylbenzyl)-malonic acid dioctadecyl ester, 2,2-bis-(3,5-di-tert.-butyl-4-hydroxybenzyl)-malonic acid didodecylmercaptoethyl ester and 2,2-bis-(3,5-di-tert.-butyl-4-hydroxybenzyl)-malonic acid di-(4-tert.-octylphenyl) ester.

Hydroxybenzyl-aromatics, such as, for example, 1,3,5-tri-(3,5-di-tert.-butyl-4-hydroxybenzyl)-2,4,6-trimethylbenzene, 1,4-di-(3,5-di-tert.-butyl-4-hydroxybenzyl)-2,3,5,6-tetramethylbenzene and 2,4,6-tri-(3,5-di-tert.-butyl-4-hydroxybenzyl)-phenol.

s-Triazine compounds, such as, for example, 2,4-bis-octylmercapto-6-(3,5-di-tert. butyl-4-hydroxyanilino)-s-triazine, 2-octylmercapto-4,6-bis-(3,5-di-tert.-butyl-4-hydroxyanilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl)-isocyanurate.

Amides of 3,5-di-tert.-butyl-4-hydroxyphenyl-propionic acid, such as, for example 1,3,5-tri-(3,5-di-tert.-butyl-4-hydroxyphenylpropionyl)-hexahydro-s-triazine and N,N'-di-(3,5-di-tert.-butyl-4-hydroxyphenyl propionyl)-hexamethylenediamine.

Esters of 3,5-di-tert.-butyl-4-hydroxyphenyl-propionic acid with monohydric or polyhydric alcohols, such as, for example, methanol, ethanol octadecanol, 1,6-hexane-diol, 1,9-nonanediol, ethylene glycol, 1,2-propane-diol, diethylene glycol, thiodiethylene glycol, neo-pentyl glycol, pentaerythritol, 3-thia-undecanol, 3-thia-pentadecanol, trimethylhexanediol, trimethylolethane, trimethylolpropane, tris-hydroxyethyl-isocyanurate and 4-hydroxymethyl-1-phospha-2,6,7-trioxabicyclo[2,2,2]octane.

Esters of 5-tert.-butyl-4-hydroxy-3-methylphenyl-propionic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo [2,2,2] octane.

Esters of 3,5-di-tert.-butyl-4-hydroxyphenylacetic acid with monohydric or polyhydric alcohols, such as, for example, methanol, ethanol, octadecanol, 1,6-hexanediol, 1,9-nonanediol, ethylene glycol, 1,2-propanediol, diethylene glycol, thio-thethylene glycol, neopentyl glycol, pentaerythritol, 3-thia-undecanol, 3-thia-pentadecanol, trimethylhexanediol, trimethylolethane, trimethylolpropane, tris-hydroxyethyl-isocyanurate and 4-hydroxymethyl-1-phospha-2,6,7-trioxabicyclo [2,2,2] octane.

Acylaminophenols, such as, for example, N-(3,5-di-tert.-butyl-4-hydroxyphenyl)-stearic acid amide and N,N'-di-(3,5-di-tert.-butyl-4-hydroxyphenyl)-thio-bis-acetamide.

Benzylphosphonates, such as for example, 3,5-di-tert.-butyl-4-hydroxybenzyl-phosphonic acid di-methyl ester, 3,5-di-tert.-butyl-4-hydroxybenzyl-phosphonic acid diethyl ester, 3,5-di-tert.-butyl-4-hydroxybenzyl-phosphonic acid dioctadecyl ester and 5-tert.-butyl-4-hydroxy-3-methylbenzyl-phosphonic acid dioctadecyl ester.

Aminoaryl derivatives, such as, for example, phenyl-1-naphthylamine, phenyl-2-naphthylamine, N,N'-diphenyl-p-phenylenediamine, N,N'-di-2-naphthyl-p-phenylene-diamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, mono- and di-octyliminodibenzyl and polymerized 2,2,4-tri-methyl-1,2-dihydroquinoline.

Metal deactivators, such as for example, oxanilide, isophthalic acid dihydrazide, sebacic acid bis-phenylhydrazide, bis-benzylidene oxalic acid dihydrazide, N,N'-diacetyl-adipic acid dihydrazide, N,N'-bis-salicyl-oyl-oxalic acid dihydrazide, N,N'-bis-salicyloyl-hydrazine and N,N'-bis-(3,5-di-tert.-butyl-4-hydroxyphenyl-propinol)-hydrazine. Phosphites, such as, for example triphenylphosphite, di-phenyl alkylphosphites, phenyl dialkylphosphites, trinonylphenyl-phosphite, trilauryl-phosphite, trioctadecylphosphite, 3,9-di-isodecyloxy-2,4,8,10-tetraoxa-3,9-diphospha-spiro [5,5] undecane and tri-(4-hydroxy-3,5-di-tert.-butylphenyl)-phosphite.

Peroxide decomposers, such as, for example, esters of β-thio-dipropionic acid, e.g. the lauryl, stearyl, myrystyl or tridecyl ester, salts of 2-mercaptobenzimidazole, e.g. the zinc salt, and diphenylthiourea.

Polyamide stabilizers, such as, for example, copper salts in combination with iodides and/or phosphorus compounds and salts of divalent manganese.

Basic co-stabilizers, such as, for example, polyvinylpyrrolidone, melamine, benzoguanamine, triallyl cyanurate, dicyandiamide, urea derivatives, hydrazine derivatives, amines, polyamides, polyurethanes and alkali metal salts and alkaline earth metal salts of higher saturated or unsaturated fatty acids, e.g. Ca stearate, Mg laurate, Na ricinoleate, K palmitate and Zn stearate.

PVC stabilizers, such as, for example, organic tin compounds, organic lead compounds and Ba/Cd salts of fatty acids.

Nucleating agents, such as, for example, 4-tert.-butyl-benzoic acid, adipic acid and diphenylacetic acid.

The following examples and referential examples are given solely for the purpose of illustrating the present invention.

Examples 1 through 7 describe the stabilized effects of the compositions of this invention against photo- and thermal-deterioration thereof. Referential examples 1 through 6 describe the preparation of the stabilizing compounds of this invention. "Part" and "%" refer to by weight unless otherwise described. Compound numbers of stabilizer refer to those of the aforementioned exemplified compounds. "Tinuvin-327" and "Tinuvin P" tested simultaneously for comparative purpose are trade names of the following compounds available from Ciba-Geigy, Co., Ltd.
Tinuvin-327: 2-(2-Hydroxy-3,5-di-tert.-butyl-phenyl)-6-chlorobenzo-1,2,3-triazole
Tinuvin P: 2-(2-Hydroxy-5-methylphenyl)benzo-1,2,3-triazole

EXAMPLE 1.

1000 Parts of polypropylene powder [melt index 20 (230°C, 2160 g)] are mixed in a Brabender Kneader with 2 parts of β-(3,5-di-tert.-butyl-4-hydroxyphenyl)-propionic acid octadecyl ester and 5 (2,5) parts of a light stabilizer from Table 1 below, at 200°C. The mixture homogenised in this way is withdrawn from the kneader and pre-pressed by means of a toggle press to give sheets with a thickness of 2-3 mm., which are subsequently converted in a heated platen press at 260°C, using suitable dies, firstly to films with a thickness of 0.3 mm. and, in a further process stage, to films with a thickness of 0.1 mm.

The films manufactured in this way are annealed for 1 hour at 150°C whilst avoiding cooling below 150°C, and are immediately afterwards quenched in water at 15°C. The films manufactured in this way show a homogeneous, fine spherulitic structure. Test specimens punched therefrom show an elongation of approx. 900%.

The polypropylene films thus manufactured are mounted on sample carriers and exposed in the Xeno-150 test apparatus. The test temperature was 45°C. After various times, pieces of film are removed, 5 test specimens at a time are punched, and their residual elongation is determined. The exposure time after which the elongation at break of the films has declined to 50% of its value before exposure to light is treated as a measure of the protective action of the individual light protection agents. The results are shown in Table 1.

Table 1

| Compound No. of stabilizer | Amount of addition (parts) | The exposure time until the elongation at break of the film declined to 50% of its initial value |
|---|---|---|
| 3 | 2.5 | 4700 |
| 4 | 2.5 | 5140 |
| 8 | 2.5 | 2200 |
| 21 | 2.5 | 4920 |
| 27 | 5 | 8900 |
| 29 | 5 | 4350 |
| 38 | 5 | 10500 |
| 39 | 5 | 6250 |
| 70 | 2.5 | > 6000 |
| None | | 800 |

EXAMPLE 2

Into 100 parts of polypropylene ("Noblen JHH-G", trade name, available from Mitsui Toatsu Chemicals Inc., twice recrystallization from monochlorobenzene) was incorporated 0.25 part of the stabilizer of this invention and the resulting mixture was mixed and melted and then molded into a sheet with a thickness of 0.5 mm. with heating.

The sheet was exposed to ultraviolet irradiation at 45°C. in a Fade-Meter and the time required until the sheet becomes brittle was measured.

The results are shown in Table 2.

EXAMPLE 3

Into 100 parts of high-density polyethylene ("Hi-Zex", trade name, available from Mitsui Toatsu Chemicals Inc., twice recrystallization from toluene) was incorporated 0.25 part of the stabilizer of this invention and the resulting mixture was mixed and melted and then molded into a sheet with a thickness of 0.5 mm. under heating and pressure.

The sheet was exposed to ultraviolet irradiation at 45°C. in a Fade-Meter and the time required until the sheet becomes brittle was measured.

The results are shown in Table 2.

Table 2

| Compound No. of stabilizer | Polypropylene | high-density polyethylene |
|---|---|---|
| 1 | 560 hrs. | hrs. |
| 4 | 520 | 1400 |
| 6 | 640 | 1540 |
| 9 | 540 | |
| 14 | 520 | 1340 |
| 21 | 500 | |
| 27 | 900 | |
| 29 | 480 | |
| 38 | 1060 | 1860 |
| 62 | 340 | |
| 70 | 860 | 1600 |
| 81 | 1100 | 1900 |
| 84 | 820 | |
| Tinuvin-327 | 340 | 700 |
| None | 60 | 400 |

EXAMPLE 4

Into 100 parts of polystyrene ("Styron", trade name, available from Asahi-Dow Limited, recrystallization from benzene-methanol) was incorporated 0.25 part of the stabilizer of this invention.

The resulting mixture was pressure-molded into a plate with a thickness of 1 mm. at 180°C. The plate was exposed to ultraviolet irradiation at 45°C. in a Fade-Meter for 500 hours. Thereafter, this test piece was measured by means of a color-difference colorimeter according to the transmission method prescribed in JIS-K7103 and the change of yellowness index was calculated according to the following equation:

$$\Delta YI = YI - YI_o$$

in which
$\Delta YI$: Change of yellowness index
$YI$: Yellowness index after exposure
$YI_o$: Initial yellowness index of the test piece The results are shown in Table 3.

Table 3

| Compound No. of stabilizer | $YI_o$ | $\Delta YI$ |
|---|---|---|
| 9 | 4.4 | +5.1 |
| 38 | 4.7 | +5.9 |
| 70 | 4.6 | +6.1 |
| 84 | 4.5 | +5.3 |
| None | 4.4 | +17.1 |

EXAMPLE 5

Into 100 parts of ABS resin ("Kane-Ace B-12", trade name, available from Kanegafuchi Chemical Industries Ltd.) was incorporated 0.5 part of the stabilizer of this invention and the resulting mixture was formed into a sheet with a thickness of about 0.5 mm. by kneading it on a kneading roll at 160°C. for 6 minutes.

After the sheet was exposed in a Sunshine Weather-Meter for 50 hours at a test temperature of 45°C, the retentions of elongation and of tensile strength thereof were measured by a tensile test.

The results are shown in Table 4.

Table 4

| Compound No. of stabilizer | Retention of elongation | Retention of tensile strength |
|---|---|---|
| 6 | 73 % | 81 % |
| 38 | 76 | 80 |
| 70 | 75 | 83 |
| 84 | 71 | 78 |
| Tinuvin-P | 61 | 71 |
| None | 54 | 71 |

EXAMPLE 6

Into 100 parts of 6-nylon resin (available from Toray Industries Corp., "CM 1011", trade name) was incorporated 0.25 part of the stabilizer of this invention. The resulting mixture was melted by heating and molded into a film with a thickness of about 0.1 mm. by means of a compression molding machine.

The film was aged under the aging condition as shown below and subjected to a tensile test to measure the retentions of elongation and of tensile strength thereof.

Aging condition:
1. Exposure to ultraviolet irradiation in a Fade-Meter at 45°C. for 200 hours.
2. Aging with heating in Geer's aging tester at 160°C. for 2 hours.

The results are shown in Table 5.

Table 5

| Compound No. of stabilizer | Fade-Meter | | Geer's aging tester | |
|---|---|---|---|---|
| | retention of elongation | retention of tensile strength | retention of elongation | retention of tensile strength |
| 9 | 68 % | 75 % | 60 % | 67 % |
| 81 | 76 | 78 | 62 | 68 |
| Tinuvin-P | 52 | 65 | 34 | 59 |
| None | 23 | 51 | 27 | 55 |

EXAMPLE 7

Into 100 parts of polycaprolactone-type polyurethane resin ("E-5080", trade name, available from Nippon Elastollan Co., Ltd.) was incorporated 0.5 part of the stabilizer of this invention and the resulting mixture was melted with heating and molded into a sheet with a thickness of about 0.5 mm.

The sheet was exposed to ultraviolet irradiation at 45°C. in a Fade-Meter for 15 hours and subjected to a tensile strength to measure the retentions of elongation and of tensile strength.

The results are shown in Table 6.

Table 6

| Compound No. of stabilizer | retention of elongation | retention of tensile strength |
|---|---|---|
| 1 | 81 % | 78 % |
| 9 | 83 | 80 |
| None | 78 | 52 |

REFERENTIAL EXAMPLE 1

1-Octyl-2,2,6,6-tetramethylpiperidine

A mixture of 56.4 parts of 2,2,6,6-tetramethylpiperidine and 38.6 parts of 1-bromooctane was heated at 125°–30°C for 120 hours. The cooled reaction mixture was filtered to remove 2,2,6,6-tetramethylpiperidine hydrobromide formed during the reaction. Fractional distillation of the residue gave 1-n-octyl-2,2,6,6-tetramethylpiperidine having a boiling point of 168°C/17 mm of Hg.

If instead of the 1-bromooctane an equivalent amount of 1-bromododecane or ethyl chloroacetate is used and otherwise the same procedure is followed, then the following products are obtained: 1-n-dodecyl-2,2,6,6-tetramethylpiperidine, b.p.115°C/0.004 mm Hg; 1-ethoxycarbonylmethyl-2,2,6,6-tetramethylpiperidine, b.p.129°–30°C/13 mm Hg.

REFERENTIAL EXAMPLE 2

1-Octoxycarbonylmethyl-2,2,6,6-tetramethylpiperidine

A mixture of 45.4 parts of 1-ethoxycarbonylmethyl-2,2,6,6-tetramethylpiperidine, 36.5 parts of 1-octanol and 0.5 part of lithium amide was heated at 110°–115°C for 48 hours, the ethyl alcohol formed during the reaction being removed by distillation. Fractional distillation of the reaction mixture gave 1-octoxycarbonylmethyl-2,2,6,6-tetramethylpiperidine having a boiling point of 120°C/0.005 mm Hg.

REFERENTIAL EXAMPLE 3

1-(2-Stearoyloxyethyl)-2,2,6,6-tetramethylpiperidine 1-(2-Hydroxyethyl)-2,2,6,6-tetramethylpiperidine (26 g, 0.092 mole) in 30 g of chloroform were saturated with dry hydrogen chloride gas with cooling. A solution of stearoyl chloride (27.9 g, 0.092 mole) in 30 g of chloroform was added and the reaction mixture was heated under reflux for 12 hours. The chloroform was removed in vacuum and the residual syrup was treated with excessive 10% sodium carbonate solution. The oil was extracted with benzene and dried by removing the benzene in vacuo. Chromatography on silica gel yielded a fraction with m.p. 30° (25 g, 50%). A nuclear magnetic resonance spectrum confirmed the structure 1-(2-stearoyloxyethyl)-2,2,6,6-tetramethylpiperidine.

REFERENTIAL EXAMPLE 4

1-(2-Stearoyloxy-2-phenylethyl)-2,2,6,6-tetramethylpiperidine

In a manner similar to the Referential Example 3 but substituting 1-(2-hydroxy-2-phenylethyl)-2,2,6,6-tetramethylpiperidine for 1-(2-hydroxyethyl)-2,2,6,6-tetramethylpiperidine there was obtained, after chromatography on a silica gel column, a liquid material which proved to be essentially pure 1-(2-stearoyloxy-2-phenylethyl)-2,2,6,6-tetramethylpiperidine by NMR spectral measurements and by elementary analysis.

Analysis for $C_{35}H_{61}NO_2$ calculated C 79.63% found C 79.36%
H 11.65% H 11.91%
N 2.65% N 2.68%.

REFERENTIAL EXAMPLE 5

Bis 2-(2,2,6,6-tetramethylpiperidino)ethyl succinate 1-(2-Hydroxyethyl)-2,2,6,6-tetramethylpiperidine (18.4 g, 0.1 mole) in 30 g of chloroform were saturated with dry hydrogen chloride gas with cooling. A solution of succinoyl chloride (7.5 g, 0.049 mole) in 30 g. of chloroform was added and the reaction mixture was heated under a reflux condenser for 15 hours. The mixture was then washed with 3 portions of 10% sodium carbonate solution and water, dried with anhydrous sodium sulfate and evaporated to give a residue which afforded pure Bis-2-(2,2,6,6-tetramethylpiperidino)ethyl-succinate (18 g, 80%), m.p. 77°–78°, after crystallization from ethanol.

REFERENTIAL EXAMPLE 6

1-Formyl-2,2,6,6-tetramethylpiperidine

A mixture of 5.0 g of 2,2,6,6-tetramethylpiperidine p-toluenesulfonate, 70 g of ethyl orthoformate and 15 ml of dimethylformamide was heated under reflux for 3 hours. Upon completion of the reaction, the excessive ethyl orthoformate and dimethylformamide were distilled off under reduced pressure and the resulting crystals were filtered and washed with ether. The filtrate and washings were combined, washed with aqueous sodium hydrogencarbonate solution and water. After being dried with anhydrous magnesium sulfate, 5.4 g of residue was obtained by evaporation of the solvent. Silica gel column chromatography of the residue (eluting solvent, benzene : ethyl acetate = 10 : 1) and further purification by sublimation gave pure desired product melting at 51.5°–52.5°C.

| Analysis for $C_{10}H_{19}NO$ calculated | C 70.96% | found | C 71.14% |
|---|---|---|---|
| | H 11.32% | | H 11.36% |
| | N 8.28% | | N 8.26%. |

What is claimed is:

1. A synthetic polymer composition stabilized against photo- and thermal-deterioration wherein there is incorporated, in a sufficient amount to prevent said deterioration, a compound having the formula

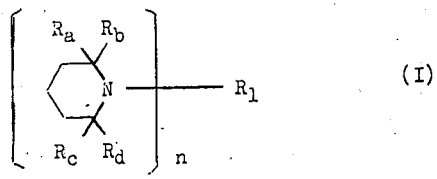

wherein
n represents 1 or 2,
$R_a$, $R_b$, $R_c$ and $R_d$ represent a methyl group, and
$R_1$ represents, when n = 1,
an alkyl group having 4 to 12 carbon atoms;
an alkenyl group having 3 to 10 carbon atoms;
an alkynyl group having 3 or 4 carbon atoms;
a benzyl group optionally substituted with 1 to 3 substituents, which may be the same or different, selected from chlorine, an alkyl having 1 to 4 carbon atoms, an alkoxy having 1 to 8 carbon atoms and hydroxy in its phenyl moiety; phenethyl group;
2,3-epoxypropyl group; or a group of the formula

—$CH_2$—CO.O—$R_2$, wherein
$R_2$ represents an alkyl group having 1 to 18 carbon atoms, an alkenyl group having 3 to 6 carbon atoms, phenyl group, benzyl group, cyclohexyl group or 2,3 epoxypropyl group; or a group of the formula

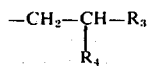

wherein
$R_3$ represents hydrogen atom, methyl group or phenyl group;
$R_4$ represents a hydroxy group or a group of the formula —O.$COR_5$;
$R_5$ represents an alkyl group having 1 to 17 carbon atoms, an alkenyl group having 2 to 4 carbon atoms, a phenyl group optionally substituted with 1 to 3 substituents, which may be the same or different, selected from chlorine, an alkyl having 1 to 4 carbon atoms, an alkoxy having 1 to 8 carbon atoms and hydroxy, benzyl group, 3,5-di-tertiary butyl-4-hydroxyphenethyl group, styryl group or cyclohexyl group; or $R_1$ may be a group of the formula

—CO—$R_6$;

wherein
$R_6$ represents a hydrogen atom, methyl group, an alkenyl group having 2 or 3 carbon atoms, an alkoxy group having 1 to 8 carbon atoms, benzyloxy group or phenoxy group;
and when n = 2,
$R_1$ represents an alkylene group having 1 to 6 carbon atoms in which the alkylene chain may optionally be interrupted by an oxygen atom; 2-butenylene group; or a group of the formula

—$CH_2$CO.O—$R_7$—O—$COCH_2$—, wherein
$R_7$ represents an alkylene group having 2 to 6 carbon atoms or xylylene group; or a group of the formula —$CH_2.CH_2$—O.CO $(R_8)_m$ CO.O—$CH_2.CH_2$— wherein
m represents 0 or 1;
$R_8$ represents an alkylene group having 1 to 10 carbon atoms in which
the alkylene chain may optionally be interrupted by a sulfur atom;
an alkenylene group having 2 to 4 carbon atoms, a phenylene group or 1,4-cyclohexylene group.

2. A synthetic polymer composition stabilized against photo- and thermal-deterioration wherein there is incorporated, in a sufficient amount to prevent said deterioration, a compound having the formula

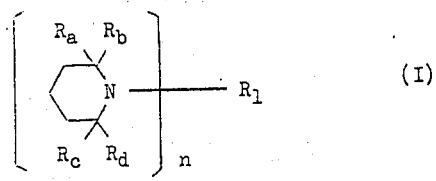

wherein
n represents 2, $R_1$ represents alkylene group having 2 to 6 carbon atoms, a group of the formula $$-CH_2.CO.O-R_7-O.CO.CH_2-$$

wherein
$R_7$ represents an alkylene group having 2 to 6 carbon atoms or a group of the formula $$-CH_2.CH_2.O.CO.-R_8-CO.O.CH_2.CH_2-$$

wherein
$R_8$ represents an alkylene group having 1 to 8 carbon atoms, m-phenylene group or p-phenylene group, and $R_a$, $R_b$, $R_c$ and $R_d$ represent a methyl group.

3. The synthetic polymer composition according to claim 1, wherein said compound (I) is incorporated in an amount of 0.01 – 5.0% by weight, based upon the amount of the synthetic polymer.

4. The synthetic polymer composition according to claim 1, wherein, n represents 1, $R_1$ represents an alkyl group having 4 to 12 carbon atoms; allyl group; benzyl group which may be substituted with an alkyl having 1 to 4 carbon atoms, methoxy or 3,5-di-tertiarybutyl-4-hydroxy in the phenyl moiety; a group of the formula $-CH_2CO.OR_2$ wherein $R_2$ represents an alkyl group having 1 to 18 carbon atoms or an allyl group; or $R_1$ may be a group of the formula $$-CH_2-CH-R_3$$
$$\quad\quad\; |$$
$$\quad\quad\; R_4$$

wherein $R_3$ represents hydrogen atom, methyl group or phenyl group and $R_4$ represents hydroxy group or a group of the formula $-O.COR_5$ wherein $R_5$ represents an alkyl group having 1 to 17 carbon atoms, alkenyl group having 2 or 3 carbon atoms, 3,5-di-tertiarybutyl-4-hydroxyphenethyl group or phenyl group which may be substituted with an alkyl having 1 to 4 carbon atoms, alkoxy having 1 to 8 carbon atoms or hydroxy.

5. The synthetic polymer composition according to claim 1, wherein n represents 1, $R_1$ represents a group of the formula $$-CH_2-CH-R_3$$
$$\quad\quad\; |$$
$$\quad\quad\; R_4$$

wherein $R_3$ represents hydrogen atom and $R_4$ represents hydroxy group or a group of the formula $-O.COR_5$ wherein $R_5$ represents an alkyl group having 1 to 17 carbon atoms, alkenyl group having 2 or 3 carbon atoms, or phenyl group which may be substituted with an alkyl having 1 to 4 carbon atoms, alkoxy having 1 to 8 carbon atoms or hydroxy.

6. The synthetic polymer composition according to claim 1, wherein said polymer is selected from the group consisting of a polyvinyl chloride, a polyvinylidene chloride, a polyacetal, a polyester, a polyamide having recurring amide groups as integral parts of the main polymer chain, a polyurethane and an epoxy resin.

7. The synthetic polymer composition according to claim 1, wherein said compound (I) is selected from the group consisting of
1-(2-stearoyloxyethyl)-2,2,6,6-tetramethylpiperidine,
1,6-bis (2,2,6,6-tetramethylpiperidino) hexane,
bis [2-(2,2,6,6-tetramethylpiperidino)ethyl] succinate,
bis [2-(2,2,6,6-tetramethylpiperidino)ethyl] -1,10-decane dicarboxylate
and
bis [2-(2,2,6,6-tetramethylpiperidino)ethyl] terephthalate.

8. The synthetic polymer composition according to claim 1, wherein said polymer is a polyolefin.

* * * * *